3,038,008
CONDENSATION OF UREA, ETHYLENE OXIDE AND POLYHYDRIC ALCOHOLS
Richard Charles Richter, Westfield, N.J., assignor to Nopco Chemical Company, Harrison, N.J., a corporation of New Jersey
No Drawing. Filed Apr. 10, 1958, Ser. No. 727,530
8 Claims. (Cl. 260—553)

This invention relates to the condensation of urea and a carrier with ethylene oxide, thereby obtaining in a novel manner products useful as humectants and is a continuation-in-part of Serial No. 665,595, filed June 13, 1957, now abandoned.

It has been the usual procedure to condense urea and ethylene oxide with sodium hydroxide as catalyst at the melting point of urea i.e., 132.7° C. Thereafter, this condensation product was blended with a glycol, e.g., ethylene glycol in order to obtain the humectant in its desired composition. However, the condensation reaction employed is extremely disadvantageous. At the temperature required, urea constantly degrades to biuret with the elimination of ammonia. This causes an internal pressure build-up in the system which must be relieved. Hence, when this procedure was carried out, production losses up to 10% occurred, due in part to degradation of urea, loss of ethylene oxide in venting the system and time and labor expended. Moreover, molten urea sublimes thereby plugging up the lines, valves, and instruments thus presenting very serious production and safety problems. Finally, it was necessary to first obtain the condensation product and thereafter blend it with the glycol in a second operation.

Accordingly, it is an object of the present invention to carry out in a more direct and efficient manner and in a single step process the condensation of a mixture of urea and a glycol with ethylene oxide thereby obviating the aforementioned difficulties while at the same time obtaining a product of comparable utility to the aforementioned blend of urea-ethylene oxide condensate and ethylene glycol.

Other objects will become apparent from the detailed description given herein. It is intended however that the detailed description and specific example do not limit the invention, but merely indicate the preferred embodiments thereof since various changes and modifications within the scope of the invention will become apparent to those skilled in the art.

It has been unexpectedly discovered that the above and other objects can be accomplished in the following manner. Urea is first dissolved in a carrier to form a solution. Thereafter, ethylene oxide is introduced and reacted with the solution in the presence of a boron trifluoride catalyst system at temperatures below the sublimation temperature of urea.

The urea which is dissolved in the carrier may be present in any amount by weight up to the amount at which it will crystallize out of the carrier, i.e., its maximum solubility in the carrier. It is, of course, understood that the maximum amount of urea soluble in the carrier will vary depending upon the particular carrier used. Preferably there is at least 10% by weight of urea in the solution comprising urea and the carrier. Various glycols may be used as the carrier alone or in admixture with each other. Examples of these are: glycerine, ethylene glycol, propylene glycol and polyglycols such as polyoxyethylene glycol and polyoxypropylene glycol having from 1 to 10 oxyalkylene groups. If ethylene glycol is the carrier, it is preferred to add about 37% by weight of the solution of urea. This quantity represents the maximum amount of urea soluble in ethylene glycol.

As catalysts, boron trifluoride, boron trifluoride etherate or boron trifluoride hydrate in an amount of from about 0.1 to 1.0% by weight of the urea may be used. Preferably about 0.5% catalyst is used. The above materials with the catalyst added to the urea solution are placed in a closed vessel. Thereafter ethylene oxide in either its gas or liquid state is introduced into the vessel. It has been found convenient to introduce into the solution from about 0.1 to 3 moles of ethylene oxide for each mole of urea. A temperature of from 60° C. to just below the sublimation temperature of urea is maintained. Depending upon the rate of introduction of ethylene oxide and the rate of reaction, the pressure of the system during operation will vary from slight vacuum to a positive pressure. However, higher or superatmospheric pressures are preferred. It is believed that some reaction with urea occurs because of the similarity of the properties of this product with the blend of urea-ethylene oxide condensate and ethylene glycol.

The following example is directed to a preferred embodiment of the present invention and is not to be construed in a limiting sense.

*Example*

29.55 parts (0.49 mole) of urea were dissolved in 50 parts (0.795 mole) of anhydrous ethylene glycol in a melting tank. Some warming was necessary as the solution of urea in the glycol is endothermic. The resulting solution was pumped into an ethylene oxide reactor. Thereafter the reactor was purged with nitrogen and 0.15 parts of boron trifluoride etherate were added. The reactor was warmed to 90° C. and 15.95 (3.62 moles) parts of ethylene oxide introduced into the reactor at a pressure of 25 p.s.i. The temperature was maintained at 90° to 100° C. Cooling was necessary to maintain this temperature as the condensation reaction is exothermic. When all of the ethylene oxide was reacted, as indicated by a pressure drop to 500 mm. of Hg, the vacuum was relieved with nitrogen and the vessel purged with nitrogen to remove any traces of ammonia that may have been present. The pH of the product was adjusted to 6.2 by the addition of 4.35 parts of glycolic acid. The product was a clear almost water white liquid. It is water-soluble and hygroscopic. The pH of a 2% aqueous solution is about 6–6.2. This product was found to be very similar to the aforementioned blend in which the urea-ethylene oxide condensate was added to ethylene glycol.

The products of my invention can be employed for many purposes where a humectant is used. One use of these products, for example is to impart a soft texture to natural and synthetic sponges. The sponge in its final wash is saturated with a dilute water solution of the humectant. Most of this is squeezed out prior to packaging, but the residual material imparts a characteristic wet feel to the sponge. This is in contrast to the normal board stiff sponges which have limited sales appeal.

Other uses for my condensation products may be briefly mentioned. These materials may be used to soften strap leather in the oil wheel in place of glycerine by addition to the fat-liquoring oils. Also they may replace glycerine as used in the manufacture of glassine paper. These products are useful as plasticizers for gelatin printing rolls and as plasticizers for cellophane. The condensation product has been successfully used as an inside coating for asphalt containers. In view of the humectant properties of these materials, other uses will become apparent to those skilled in the art.

As the foregoing has indicated, a novel condensation process has been discovered. As a result, the reaction is carried out in a more economical manner than in prior processes thereby bringing about high yields. Losses of urea due to degradation are reduced. Losses of ethylene oxide due to venting from the reaction vessel of the gases formed in the reaction when the reaction is carried out in the conventional manner are eliminated. Also savings are accomplished by use of lower temperatures. Furthermore, there is no plugging of the equipment due to urea sublimation. From a safety standpoint, the present invention removes the danger of explosion due to increased pressure build-ups and due to blockages throughout the system from sublimed urea. Neither is it necessary to employ a second blending step as is done with the urea-ethylene oxide condensate. The process is admirably suited for a semi-continuous operation.

As yet I have not determined the precise nature of the products of my process. However, since some of the carriers, i.e., the glycols are known to react with ethylene oxide, such reaction may occure here. Likewise ethylene oxide is known to react with urea and this reaction may also occur herein. It is also conceivable that the ethylene oxide in some manner may act as a bridge to join the urea and glycol carrier in a chemical relationship. Thus, the product may comprise a condensate of urea and ethylene oxide, the carrier, some unreacted urea and possibly some condensation products of ethylene oxide and the carrier and condensation products of urea and the carrier. However, products prepared according to my process have been analyzed for their free urea content by making use of the reaction of xanthhydrol with urea. [See "A Text-Book of Practical Organic Chemistry Including Qualitative Organic Analysis," Vogel, Third Edition, 1956, Longmans, Green & Co. (page 442).] From the amount of free urea that reacts with xanthhydrol, the amount of urea consumed during reaction is calculated since the total quantity of urea present during the condensation is known. Such analysis has shown that 43.5% urea has been consumed during reaction, assuming that there is 35.8% by weight of excess urea based on the theoretical amount of urea which will react with ethylene oxide on a mole for mole basis. Suffice it to say that the present process when carried out results in a new composition of matter which is analogous in use to the blend of urea-ethylene oxide condensate and ethylene glycol previously referred to because of its humectant properties.

Having described my invention, what I claim as new and desire to secure by Letters Patent is:

1. A process for condensing ethylene oxide with a solution of urea and a carrier selected from the group consisting of glycerine, glycols having from 1 to 10 oxyethylene groups and glycols having from 1 to 10 oxypropylene groups which comprises condensing with said solution ethylene oxide at a temperature between 60° C. and just below the sublimation temperature of urea in the presence of a catalyst selected from the group consisting of boron trifluoride, boron trifluoride etherate, and boron trifluoride hydrate, said condensation reaction being carried out in a closed system.

2. A process for condensing ethylene oxide with a solution of urea and a carrier selected from the group consisting of glycerine, glycols having from 1 to 10 oxyethylene groups and glycols having from 1 to 10 oxypropylene groups which comprises condensing with said solution from about 0.1 to 3 moles of ethylene oxide introduced for each mole of urea at a temperature between 60° C. and just below the sublimation temperature of the urea in the presence of a catalyst selected from the group consisting of boron trifluoride, boron trifluoride etherate and boron trifluoride hydrate, said condensation reaction being carried out in a closed system.

3. The process of claim 2 in which said carrier is ethylene glycol.

4. A process for condensing ethylene oxide with a solution of urea and a carrier selected from the group consisting of glycerine, glycols having from 1 to 10 oxyethylene groups and glycols having from 1 to 10 oxypropylene groups which comprises condensing at superatmospheric pressure with said solution from about 0.1 to 3 moles of ethylene oxide introduced for each mole of urea, said urea being dissolved in said carrier in an amount present up to just below its crystallization concentration, at a temperature between 60° C. and just below the sublimation temperature of the urea in the presence of a catalyst selected from the group consisting of boron trifluoride, boron trifluoride etherate and boron trifluoride hydrate, said condensation reaction being carried out in a closed system.

5. The process of claim 4 in which said carrier is a glycol.

6. The process of claim 5 in which said glycol is ethylene glycol.

7. A process for condensing ethylene oxide with a solution of urea and ethylene glycol which comprises forming a solution of urea in ethylene glycol by dissolving about 1 mole of urea in about 1.6 moles of ethylene glycol, thereafter condensing said solution at superatmospheric pressure with ethylene oxide in the presence of 0.5% by weight of boron trifluoride etherate as catalyst based on the weight of urea by introducing into said solution about 0.735 moles of ethylene oxide while maintaining the reaction temperature at about 90° to 100° C.

8. The process of claim 7 in which the pressure is about 25 p.s.i.

References Cited in the file of this patent

UNITED STATES PATENTS

| | | |
|---|---|---|
| 1,902,889 | Paquin | Mar. 28, 1933 |
| 2,059,213 | Piggott | Nov. 3, 1936 |
| 2,483,194 | Gleim | Sept. 27, 1949 |
| 2,498,195 | Ballard et al. | Feb. 21, 1950 |
| 2,668,807 | Greenlee | Feb. 9, 1954 |
| 2,834,799 | Sowa | May 13, 1958 |

OTHER REFERENCES

Jacobson: J. Am. Chem. Soc., vol. 60, pages 1742–44 (1938).

Paquin: "Kunststoffe," vol. 37, pp. 165–171 (August 19, 1947).